UNITED STATES PATENT OFFICE.

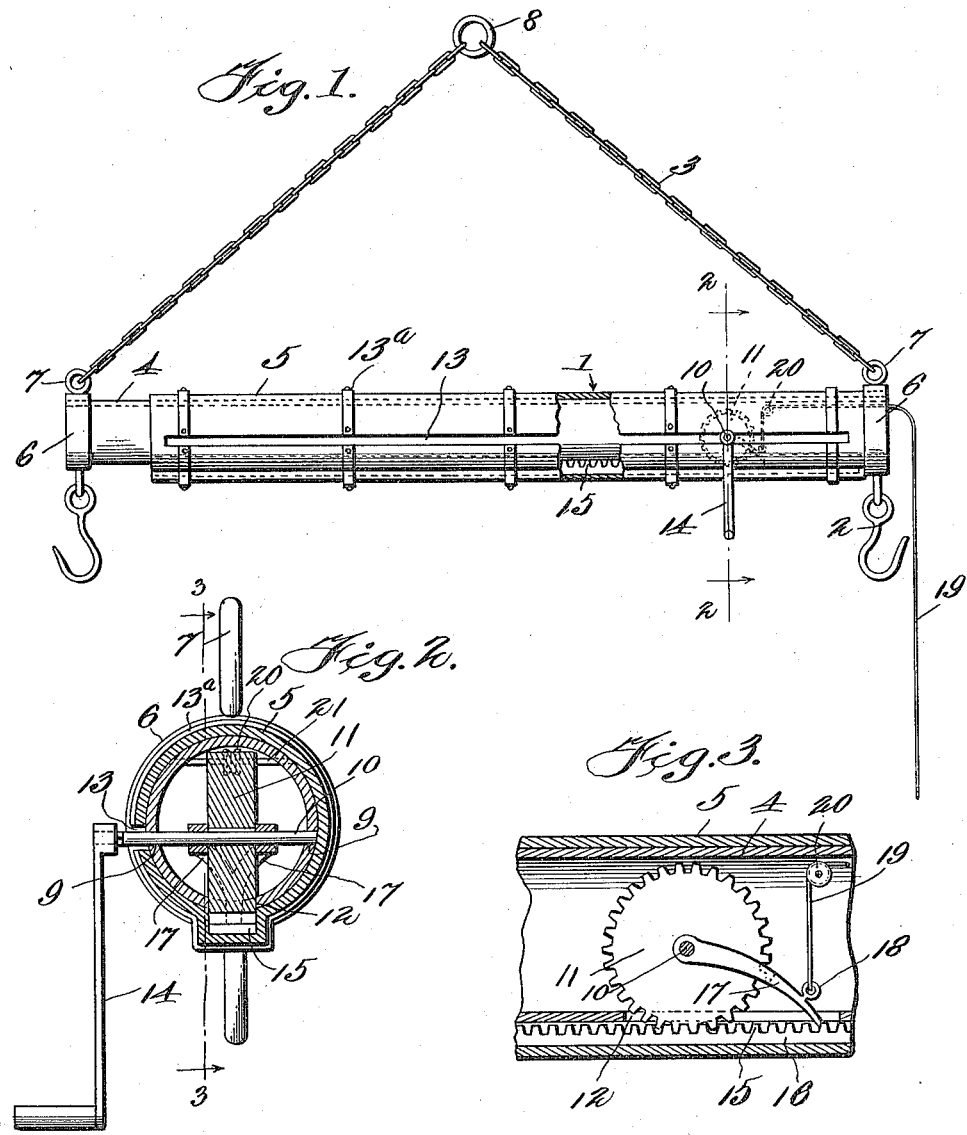

JOSEPH McGRATH, OF MANTENO, ILLINOIS.

ADJUSTABLE HOG-GAMBREL.

1,148,393.  Specification of Letters Patent.  Patented July 27, 1915.

Application filed April 20, 1915. Serial No. 22,606.

*To all whom it may concern:*

Be it known that I, JOSEPH MCGRATH, a citizen of the United States, residing at Manteno, in the county of Kankakee and State of Illinois, have invented certain new and useful Improvements in Adjustable Hog-Gambrels; and I do hereby declare the following to be a full, clear, and exact description of the invention, such as will enable others skilled in the art to which it appertains to make and use the same.

My invention relates to new and useful improvements in hog gambrels, the same comprehending a bar, hooks secured to the bar, and a suspending element secured to the bar.

One object of my invention is a provision of a hog gambrel of the above stated character wherein the length of the bar may be increased or decreased so as to permit the gambrel to be used in connection with animals of various sizes.

A still further object of the invention is the provision of a hog gambrel of the above stated character wherein the length of the bar may be increased during the dressing operation whereby the rear quarters of a hog may be spread indefinitely after the initial cutting so that the entrails may be readily and quickly removed.

A still further object of the invention is the provision of a hog gambrel which shall be simple, durable and efficient and which may be manufactured and sold at a comparatively low cost.

With these and other objects in view further references may be had to the drawings of which:

Figure 1 is a view in side elevation of a hog gambrel constructed in accordance with my invention, Fig. 2 is a transverse sectional view taken in the vertical plane indicated by the line 2—2 of Fig. 1 looking in the direction indicated by the arrows and Fig. 3 is a longitudinal sectional view of a fragmentary portion of the bar taken on the vertical plane indicated by the line 3—3 of Fig. 2 looking in the direction indicated by the arrow.

Referring to the drawings by reference numerals, 1 designates the bar, 2 the hooks, and 3 the suspending element of my improved hog gambrel.

The rod 1 comprising a pair of telescopic members 4 and 5, to the other end of which the hooks 2 and the suspending element 3 are secured. The suspending element and hooks are attached by means of a cap 6 which is secured to the free ends of the members 4 and 5 and have rings 7 formed on the upper and lower sides thereof to receive the above mentioned elements. The suspending element comprises suitable chains adapted to have their free ends connected by a suitable ring 8 so that said suspending element may be attached to any suitable support.

The member 4 is adapted to telescope within the member 5 and provided with suitable bearings 9 in one end thereof. These bearings 9 are adapted to have a transverse shaft 10 journaled therein, for the purpose of supporting a pinion 11. The pinion 11 is so supported within the member 4 to protrude through a slot 12 in the bottom wall of the member 4. One end of the shaft 10 is squared and adapted to extend through an elongated slot 13 in the side wall of the member 5 to receive an operating handle 14. It will be noted from Fig. 1 of the drawing that this slot 13 extends practically the entire length of the member 5 and will allow the shaft 10 to move longitudinally of said member 5. As the elongated slot 13 may weaken the member 5, split reinforcing bands 13ª are adapted to have one of their ends secured to said member 5, adjacent the top of the elongated slot 13 and to pass around the member 5 and secured adjacent the under side of said slot 13.

The member 5 is offset outwardly on its under side to provide a longitudinally extending recess 15. A rack 16 is secured within the recess 15 and adapted to mesh with said pinion 11. It will be seen from this construction that by rotating the shaft 10 by the handle 14 the pinion 11 will be forced to travel along the rack 16, thus causing the member 4 to travel outwardly from within the member 5, whereby the dimension of the hog gambrel may be increased as desired.

A suitable means is provided to lock the member 4 in any desired extended position, comprising a dog 17 having one of its ends bifurcated to form a pair of arms 18 which are journaled upon the shaft 10 on each side of the pinion 11. The opposite end of the dog 17 is bent downwardly and normally engages the rack 16 so as to lock the member 4 against inward movement.

Means are provided for raising the dog 17 from engagement with the rack 16 so that the member 4 can return within the member 5 after being extended when desired. A loop 18 is formed on the downwardly bent end of the dog 17 and a cord 19 is attached to said loop 18 and adapted to pass over a pulley 20 which is journaled upon a shaft 21 carried by the member 4 adjacent one end thereof. The free end of the cord 19 passes outwardly from one end of the members 4 and 5 and can be pulled by the operator when desired to return the member 4 within the member 5.

From the foregoing description it can be seen that the rear legs of a hog can be spread indefinitely apart by rotating the pinion 11 which will cause the member 4 to extend outwardly from the member 5 creating what dimension of spreading desired by the operator. After the dressing operation has been completed, the operator may pull upon the cord 19 raising the dog 17 from engagement with the rack 16 and rotate the pinion 11 in a reverse direction, bringing the said member 4 within the member 5. Thus the spreading tension of the rear legs of the hog may be decreased so as to easily remove said legs from the hooks 2.

Having thus described my invention, what I claim is:—

1. An adjustable hog gambrel comprising a pair of telescopic members, means for supporting said members, means for attaching a hog to said members, bearings formed on the inner walls of the inner member, a transverse shaft journaled in said bearing, a pinion mounted on said shaft and adapted to extend through a slot in the lower wall of said member, an offset formed on the lower wall of the outer member, a rack secured within said offset portion and adapted to mesh with said pinion, means for rotating said pinion, means for allowing the shaft to travel longitudinally of the outer member, means for allowing the inner member to be locked at any desired position, and means for unlocking the said inner member.

2. An adjustable hog gambrel comprising a pair of telescopic members, a transverse shaft journaled in the side walls of the inner member and one end of said shaft extending through an elongated slot of the outer member, a pinion mounted on said shaft, a rack secured to the inner bottom walls of the outer member and adapted to mesh with said pinion, means for rotating said pinion, means for locking the inner member, means for unlocking said inner member, means for supporting said members, and means for attaching a hog to the free end of said members.

3. An adjustable hog gambrel comprising a pair of telescopic members, means for supporting said members, a transverse shaft journaled in the inner member, a pinion mounted on said shaft, a rack secured to the outer member, a dog journaled upon said shaft and adapted to engage said rack, means for raising said dog from engagement with the rack, and means for allowing the transverse shaft to travel longitudinally of the outer member.

4. An adjustable hog gambrel including two tubular members slidably mounted on one another, means to adjust said members, means to hold said members from movement in one direction and means to release said holding means, said holding and adjusting means being inclosed within said tubular member.

5. An adjustable hog gambrel comprising inner and outer hollow members, the outer member telescopically receiving the inner member and having a longitudinally extending slot, a rack secured to the outer member, a shaft journaled in the inner member and having one end extending through the slot in the outer member, a pinion carried by the shaft and meshing with said rack, a handle secured to the extended end of the shaft, hooks secured to the outer ends of the members, and means for suspending the gambrel.

In testimony whereof I affix my signature in presence of two witnesses.

JOSEPH McGRATH.

Witnesses:
EVERETT W. LAIRD,
GEO. A. BATES.

Copies of this patent may be obtained for five cents each, by addressing the "Commissioner of Patents, Washington, D. C."